United States Patent [19]

Bensinger et al.

[11] 3,978,824

[45] Sept. 7, 1976

[54] ROTARY PISTON INTERNAL COMBUSTION ENGINE OF TROCHOIDAL CONSTRUCTION

[75] Inventors: Wolf-Dieter Bensinger, Stuttgart; Günter Wörner, Rommelshausen; Dietrich Kurz, Stuttgart, all of Germany

[73] Assignee: Daimler-Benz Aktiengesellschaft, Germany

[22] Filed: Dec. 12, 1974

[21] Appl. No.: 532,177

Related U.S. Application Data

[63] Continuation of Ser. No. 307,764, Nov. 20, 1972, abandoned.

[30] Foreign Application Priority Data

Nov. 20, 1971 Germany............................ 2157646

[52] U.S. Cl. .............................................. 123/8.09
[51] Int. Cl.² .......................................... F02B 53/12
[58] Field of Search................ 123/8.01, 8.09, 8.45, 123/21, 117 R, 117 A, 198 F

[56] References Cited
UNITED STATES PATENTS

| 3,352,290 | 11/1967 | Kuroda.............................. | 123/8.07 |
| 3,589,344 | 6/1971 | Steinke.............................. | 123/8.09 |
| 3,735,739 | 5/1973 | Panhard............................ | 123/8.09 |
| 3,857,368 | 12/1974 | Kishimoto et al................. | 123/8.09 |
| 3,868,928 | 3/1975 | Kishimoto et al................. | 123/8.09 |

Primary Examiner—Carlton R. Croyle
Assistant Examiner—Michael Koczo, Jr.
Attorney, Agent, or Firm—Craig & Antonelli

[57] ABSTRACT

A rotary piston internal combustion engine of trochoidal construction which operates with ignition of fuel-air mixture by spark plugs and which is equipped with a polygonal piston, for example, a triangular piston rotatably supported on the eccentric of an eccentric shaft. The piston slides with its corners along the trochoidal running surface, for example, along a two-arched trochoidally shaped running surface while a piston flank is disposed between each two corners of the piston, to which is coordinated a working chamber within the housing. The casing is also provided with an inlet channel having a throttling member arranged therein and with an exhaust channel. An arrangement is provided which in dependence on the number of stages of the engine and with a closed and substantially closed throttling device prevent, after an ignition of the fuel-air mixture in a working chamber, at least once an ignition of the fuel-air mixture in the same working chamber for purposes of achieving a high uniformity and/or small periodic length of the torque at the eccentric shaft by the suppression of the ignition pulse.

27 Claims, 15 Drawing Figures

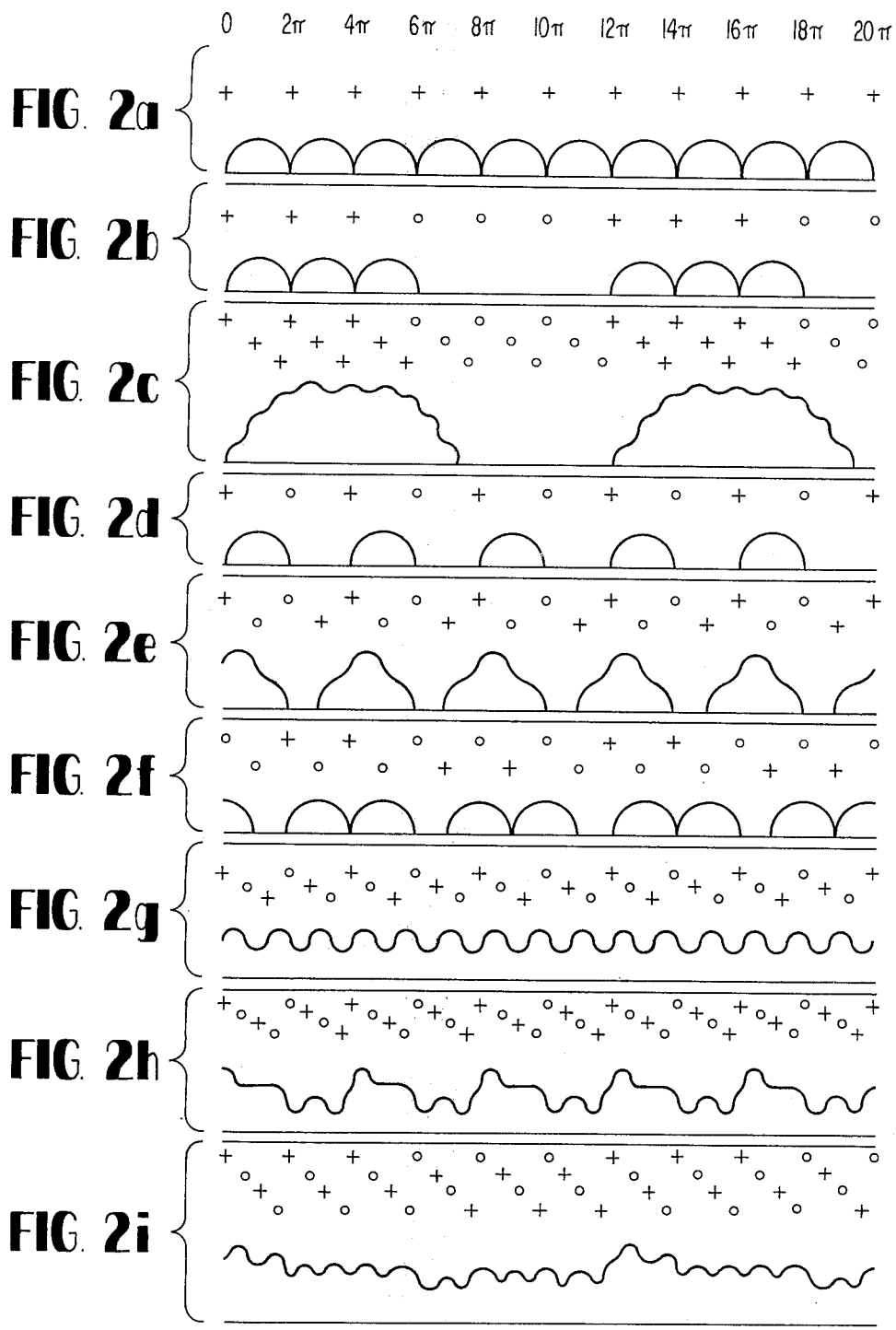

ROTARY PISTON INTERNAL COMBUSTION ENGINE OF TROCHOIDAL CONSTRUCTION

This is a continuation, of application Ser. No. 307,764 filed 11/20/72 now abandoned.

The present invention relates to a single or multi-stage rotary piston internal combustion engine of trochoidal construction with ignition of a fuel-air mixture by means of spark plugs which includes a triangular piston per stage supported on an eccentric of an eccentric shaft, which piston slides with its corners along a two-arched trochoidal running surface and between whose two corners each is disposed a piston flank, to which is coordinated a respective working chamber, and which further includes an inlet channel with a throttling device arranged therein and an exhaust channel.

Such rotary piston internal combustion engines tend with a closed and with a substantially closed throttling device toward an uneven running, which becomes noticeable by jerking or sputtering. This uneven running stems from the fact that during the cross-over or overlap in the course of the exhaust of the combustion gases, the latter reach the suction chamber by way of the gap between the piston and the trochoidal running surface which is larger than the opening cross section of the throttling member, until the piston corner trailing the suction chamber has passed or swept over the exhaust channel. Only then fresh gases are sucked-in out of the inlet channel. However, these fresh gases are not sufficient to obtain an ignitable mixture in the working chamber. This working chamber therefore pushes uncombusted gases into the exhaust channel which during the following cross-over or overlap are again partially sucked into the same working chamber. Together with the further fresh gases out of the inlet channel, an ignitable mixture then forms which is combusted so that the combustion gases reach the exhaust channel. The same operating cycle thus begins anew. It has now been discovered that in general the gases in the three working chambers of a single stage of a rotary piston internal combustion engine ignite sequentially one following the other and subsequently do not ignite, thus three ignitions are followed by three non-ignitions. This operating rhythm of a single stage of a rotary piston internal combustion engine is maintained with a high degree of constancy. The very considerable disadvantages result therefrom that this operating rhythm exhibits a high non-uniformity and a long periodic length or cycle duration of the torque at the eccentric shaft. The length of the cycle or periodic repetition is six times larger than if the fresh gases would ignite each time. As a result thereof, the frequency of the torque, especially during running of the rotary piston internal combustion engine connected with a further system, for example, a motor vehicle, in the lower rotational speed range becomes so low that the frequencies of the natural oscillations or vibrations of the further system connected to the engine are attained. The resonant vibrations resulting therefrom are harmful both for the rotary piston internal combustion engine as also for the connected system and, in case this is a motor vehicle, become very unpleasant for the passangers thereof. These effects which occur in a rotary piston internal combustion engine with a single stage can be still further enhanced in case of a multi-stage engine.

The present invention is concerned with the task to so constitute the uniformity and cyclic or periodic length of the torque at the eccentric shaft that the aforementioned disadvantages are eliminated or at least considerably reduced.

The underlying problems are solved according to the present invention in that means are provided which in dependence on the number of stages in the rotary piston internal combustion engine and with a closed and substantially closed throttling device prevent, after an ignition of the fuel-air mixture in a working chamber, at least once an ignition of fuel-air mixture in this working chamber for acheiving as high as possible a degree of uniformity and/or small periodic length of the torque at the eccentric shaft by the suppression of the ignition pulse.

The construction of the rotary piston internal combustion engine according to the present invention makes it possible to so influence the ignition sequence within each stage of the rotary piston internal combustion engine and of all stages together that a torque is produced with the necessary properties without attempting, as would be apparent, to so change the conditions that the non-ignitions of the fuel-air mixture no longer occur. The ignition sequence of the rotary piston internal combustion engine is thus no longer accidental or haphazardous but definitive and can be predetermined in the most favorable manner.

In one advantageous embodiment of the present invention, each second ignition pulse is suppressed in each stage of the rotary piston engine whereby with a rotary piston internal combustion engine with more than one stage the phases of these ignition rhythms are mutually offset, i.e., phase-displaced. A particularly favorable result is obtained thereby as regards the periodic length of the torque, for the latter is only twice as long as during the operation of the engine with an open or substantially open throttle member, during which practically no ignitions are missed. This construction of the present invention results in the best solution for a rotary piston internal combustion engine with a single stage.

In another embodiment of the present invention with a rotary piston internal combustion engine with at least two stages, at least three ignition pulses following one another are suppressed in each stage, which in turn are followed by one to three ignition pulses whereby the phases of these ignition rhythms are mutually offset, i.e., phase-displaced. With this construction, a high uniformity of the torque is achieved, especially if a favorable phase linkage is selected.

In a third embodiment of the present invention with a rotary piston internal combustion engine with at least two stages, the individual stages have different ignition rhythms thereby minimizing if not eliminating resonant vibration and achieving a high uniformity and cyclic or periodic length of the torque at the eccentric shaft.

In a rotary piston internal combustion engine with an uneven number of at least three stages having eccentrics uniformly distributed over the circumference of the eccentric shaft, it is favorable if each second ignition pulse is suppressed for the entire rotary piston internal combustion engine. This represents for this type of rotary piston internal combustion engine the best solution as regards not only the length of the cycle but also as regards the uniformity of the torque.

In a rotary piston internal combustion engine with two disks, three ignition pulses following one another can be suppressed in each stage which are followed by two ignition pulses whereby these operating rhythms are mutually offset, i.e., phase-displaced. A high uniformity with a relatively short cyclic length of the torque is attained with such an arrangement.

The suppression of the ignition pulses can take place by interruption of the energizing circuit for each spark plug either electronically, for example, by an inhibiting circuit such as disclosed in U.S. Pat. No. 3,589,344, or electromechanically by any known conventional means.

An advantageous and simple construction of an electromechanical interruption of the energizing circuit resides in that two parallelly connected lines are provided in the energizing circuit of which one is interrupted with a closed and substantially closed throttling member whereas a contact disk is arranged in the other line which rotates with a fraction of the rotational speed of the eccentric shaft corresponding to the ignition rhythm and which is provided at the circumference with conducting and non-conducting elements corresponding to the desired, predetermined ignition rhythm. The ignition pulses flow thereby during the operation of the rotary piston internal combustion engine with a closed or substantially closed throttle device by way of the first line in which, for example, a switch is installed directly connected with the throttling member whereas only in the other operating conditions, ignition pulses are suppressed by the contact disk in the desired number and sequence.

This construction can be constituted in a rotary piston internal combustion engine installed into a motor vehicle in that a third line is connected in parallel with the two lines which third line is closed only when the rotary piston internal combustion engine is idling and the vehicle stands still, i.e., no torque connection between the vehicle and the rotary piston internal combustion engine. It is assured by this arrangement that ignition pulses are suppressed only during the operation of the rotary piston internal combustion engine with a closed or substantially closed throttle device.

Accordingly, it is an object of the present invention to provide a rotary piston internal combustion engine of trochoidal construction which avoids by simple means the aforementioned shortcomings and drawbacks encountered in the prior art.

Another object of the present invention resides in a rotary piston internal combustion engine of trochoidal construction which eliminates or at least extensively minimizes uneven running of the engine.

A further object of the present invention resides in a rotary piston internal combustion engine of trochoidal construction which considerably improves the cyclic periodic characteristics of the torque at the eccentric shaft as regards the length thereof.

A further object of the present invention resides in a rotary piston internal combustion engine, especially of motor vehicles, in which the frequency of the torque at the eccentric shaft of the engine is maintained sufficiently high under all operating conditions so that the frequencies of the relatively low natural oscillations and vibrations of the system connected to the engine are not reached.

Another object of the present invention resides in a rotary piston internal combustion engine for motor vehicles which greatly improves the comfort for the passengers.

These and further objects, features and advantages of the present invention will become more apparent from the following description when taken in connection with the accompanying drawing which shows, for purposes of illustration only, several embodiments in accordance with the present invention, and wherein:

FIG. 2a is a schematic representation of the ignition sequence and torque curve at the eccentric shaft of a rotary piston internal combustion engine during with an open or substantially open throttling device operation;

FIGS. 2b and 2c are schematic representations of the ignition sequence and torque curves at the eccentric shaft of a rotary piston internal combustion engine with a closed or substantially closed throttling device without control of the ignition pulses;

FIGS. 2d–2k are schematic representations of various embodiments for the ignition sequence and torque curves at the eccentric shaft of a rotary piston internal combustion engine operating with a closed or substantially closed throttling device with control of the ignition pulses in accordance with the present invention;

Figure 1:
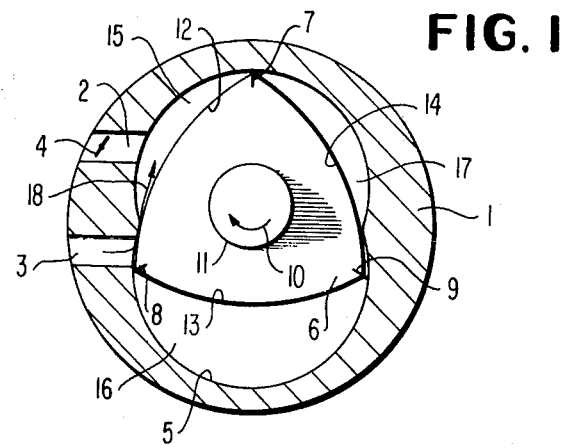
FIG. 1 is a schematic cross-sectional view through a single stage of a rotary piston internal combustion engine as used with the present invention.

Referring now to the drawing and more particularly to FIG. 1, the latter illustrates a cross-section through a casing 1 of a single stage rotary piston internal combustion engine of trochoidal construction; an inlet channel 2 and an exhaust channel 3 are arranged in the casing 1. A throttle valve 4 disposed in the inlet channel 2 is substantially closed, i.e., the rotary piston internal combustion engine is therefore pushed or driven by the vehicle in case it is installed within a driving motor vehicle. The casing 1 is delimited inwardly by a two-arched trochoidal running surface 5 along which slides a triangular piston 6 with its three corners 7, 8 and 9. The piston 6 rotates in the direction of rotation 10 on an eccentric 11 of an eccentric shaft which rotates in the same direction of rotation 10 but with three time the rotary velocity relative to the stationary casing 1. One piston flank 12, 13, 14 each is disposed between two respective piston corners 7, 8, 9, to which is coordinated a correspondng working chamber 15, 16, 17. These working chambers 15, 16 and 17 therefore rotate together with the piston 6 within the casing 1 whereby the gases present therein carry out a four-cycle process during each complete revolution.

The working chamber 15 is illustrated at the beginning of the suction cycle, i.e., it is in communication both with the inlet channel 2 and also with the exhaust channel 3. During this cross-over or overlap, gases are sucked out of the exhaust channel 3 into the working chamber 15 since with a substantially closed throttle valve 4 the passage or flow cross section in the inlet channel 2 is smaller than the smallest cross section between the piston 6 and the trochoidal running surface 5 in proximity of the exhaust channel 3. If now during the last, preceding rotation of the piston 6, an ignition has taken place in the working chamber 15, then exhaust gases are sucked out of the exhaust channel 3 into the working chamber 15 which is indicated by the arrow 18, and only after the piston corner 8 has swept over the exhaust channel 3, fresh gases reach out of the inlet channel 2 into the working chamber 15, and more particularly into the trailing portion thereof. This mixture is not sufficient for an ignition during the next rotation of the piston 6 so that in addition to exhaust gases also fresh gases are exhausted into the exhaust channel 3. The latter are sucked to a large extent into the working chamber 15 during the cross-over or overlap so that together with the fresh gases from the inlet channel 2 an ignitable mixture results. As a result thereof, an ignition takes place therefore in each working chamber 15, 16 and 17 only during each second rotation of the piston 6.

In contradistinction thereto, during load operation, i.e., when the throttle valve 4 is opened and the throttling cross section in the inlet channel 2 is large, an ignitable mixture forms during each rotation because only relatively few exhaust gases reach the working chambers 15, 16 and 17.

This ignition and operating rhythm is illustrated in FIG. 2a for a single stage rotary piston internal combustion engine. The ignitions are respresented by crosses $x$ whereas the torque transmitted thereby over ther eccentric shaft 11 is represented by semi-circles. Thus, three ignitions follow one another per rotation of the piston 6, i.e., one ignition per rotation of the eccentric shaft. This fact is illustrated above FIG. 2a in the row 0, $2\pi$, $4\pi$ .... The periodic or cyclic length of the torque amounts in the instant case to $2\pi$, i.e., is therefore very small. The uniformity of the torque is relatively high. With a rotary piston internal combustion engine with n stages and with eccentrics distributed uniformly over the circuimference of the eccentric shaft, the uniformity of the torque increases during load operation whereas its periodic or cyclic length decreases to the nth part.

Possible ignition and operating rhythms for rotary piston internal combustion engines with one and with three stages during an operation with a closed or substantially closed throttling valve 4 are illustrated in FIGS. 2b and 2c if an ignition control does not take place. In that case, three sequential ignitions are followed by three sequential non-ignitions in each stage. The non-ignitions are thereby indicated by small circles in the same line as the ignitions, again represented by small crosses. The periodic or cyclic length of the torque amounts in both cases to $12\pi$, and is therefore at least six times larger than during load or open throttle operation, and the uniformity of the torque is very low especially with three stages.

In FIG. 2d is illustrated an ignition and operating rhythm for a rotary piston internal combustion engine with a single stage in which each second ignition pulse is suppressed. The working chambers of the embodiment of FIG. 1 therefore ignite in the sequence 15, 17, 16, 15. The torque curve is considerably more uniform than in FIG. 2b and the periodic length, i.e., the duration of a cycle amounts only to $4\pi$, i.e., is therefore only twice as large as during a load or open throttle operation.

FIG. 2e, the same ignition rhythm per stage as in FIG. 2d is applied to a rotary piston internal combustion engine with two stages. The periodic or cyclic length, i.e., the duration of a cycle again amounts to $4\pi$, however, the non-uniformity of the torque is large. A better solution is represented by the ignition and operating rhythm of FIG. 2f. In this latter case, two ignitions are followed by three sequential suppressions of ignition pulses in each stage whereby the ignition rhythms of the two stages are mutually offset. i.e., phase-displaced with respect to one another. Consequently, two ignition pulses are suppressed one after the other for a working chamber in a predetermined sequence. The periodic length, i.e., the duration of the cycle of the torque is $5\pi$ somewhat longer than in FIG. 2e, however, the uniformity is considerably better.

FIG. 2g illustrates an ignition and operating rhythm for a rotary piston internal combustion engine with three stages whose three eccentrics are displaced with respect to each other by 120°. Each second ignition pulse is thereby suppressed in each stage and in the entire rotary piston internal combustion engine. The uniformity of the torque is similarly good as during a load or open throttle operation and the cycle length is still slightly smaller with $4/3\pi$ than with one stage under a load or open throttle operation.

FIGS. 2h and 2i illustrate ignition and operating rhythms for rotary piston internal combustion engines with four stages. In the former embodiment, each second ignition pulse is suppressed in each stage. The periodic length of the torque, i.e., the duration of its cycle is rather favorable with $4\pi$; however, the non-uniformity is very large even though better than, for example, in FIG. 2e. In contradistinction thereto, in the example of FIG. 2i, three ignition each are followed by three non-ignitions in each, an ignition rhythm which, without interaction from the outside, may entail very unfavorable results as demonstrated by FIGS. 2b and 2c. However, as the torque curve of FIG. 2i shows, with a suitable linkage or interrelation of the ignition rhythms in the individual stages, which is made possible only by an intentional suppression of ignition pulses, a very high uniformity of the torque is achieved. Even though the periodic length is very high with $12\pi$, the peaks of the torque are so small that no strong vibrations or oscillations can be produced thereby within a resonance range.

Figure 2K:
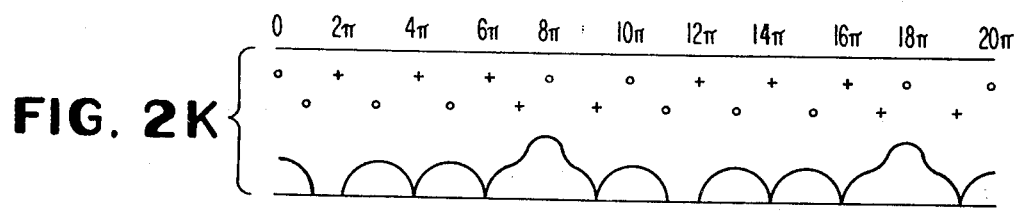
Figure 2J:
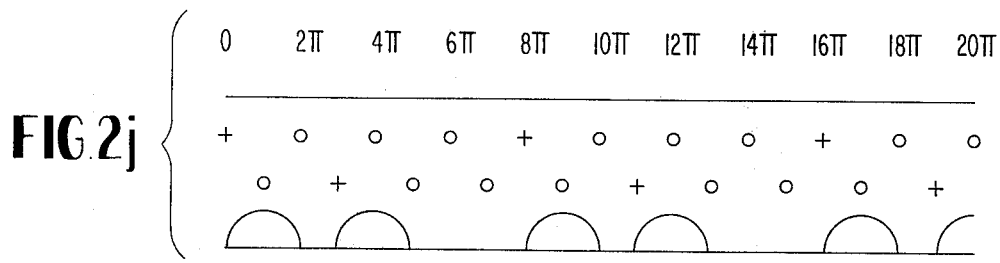

FIGS. 2j and 2k illustrate an ignition and operating rhythm for rotary piston internal combustion engines with two stages. In each stage of the rotary piston internal combustion engine of FIG. 2j an ignition pulse is followed by three non-ignitions with the ignition rhythms of the two stages being mutually offset, i.e., phase-displaced with respect to one another. In each stage of the rotary piston internal combustion engine of FIG. 2k a different ignition rhythm is provided. The periodic or cyclic length of the ignition and operating rhythms for the rotary piston internal combustion engine of FIG. 2j is $5\pi$ with the torque being considerably uniform. Likewise, with regard to the ignition and operating rhythm of the rotary piston internal combustion engine of FIG. 2k a considerably uniform torque is realized.

Figure 3:
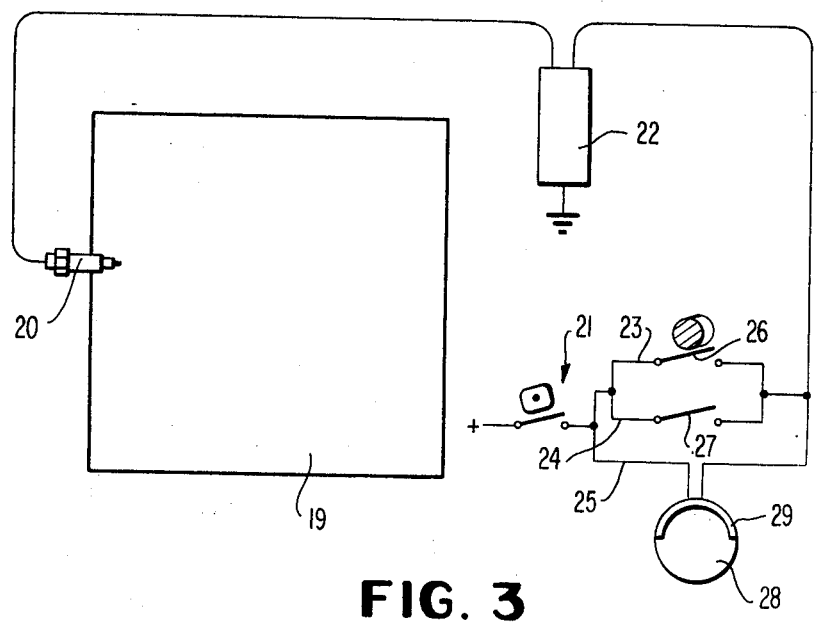
FIG. 3 is a schematic view of one embodiment of the means for controlling the ignition pulses in accordance with the present invention.

FIG. 3, schematically illustrates an electromechanical pulse suppression arrangement whereby with a closed or substantially closed throttle valve 4 the ignition pulses are suppressed in a single stage rotary piston internal combustion engine installed into a motor vehicle. An eccentric shaft (not shown) rotates in a housing 19. Ignition pulses are fed to a spark plug 20 in the housing 19 by way of an interrupter 21 and an ignition coil 22. Three lines 23, 24 and 25 are connected in parallel between the interrupter 21 and the ignition coil 22. A switch 26 is interconnected in the one line 23 which is actuated together with the throttle valve 4 (FIG. 1) by the drive pedal (not shown) of the motor vehicle. The switch 26 is open only with a closed and substantially closed throttle valve 4 but is closed otherwise so that during a load or open throttle operation, all ignition pulses are conducted from the interrupter 21 to the spark plug 20. A switch 27 is interconnected in the second line 24 and is closed only when the internal combustion engine is idling and the motor vehicle stands still, i.e., no torque connection between the vehicle and the engine. A suppression of ignition pulses is not necessary in this condition since, in this case, the rotary piston internal combustion engine does not produce any torque and therewith also no vibrations can be transmitted to the motor vehicle. A contact disk 28 is interconnected in the third line 25, which rotates with half the rotational speed of the eccentric shaft. The contact disk is provided only over half of its circumference with an electrically conductive layer 29 so that the line 25 is closed during one-half of the rotation of the contact disk 28 and is interrupted during the other half-rotation. This installation makes possible that only during an operation of the rotary piston internal combustion engine with a closed or substantially closed throttle valve 4 an ignition pulse is suppressed during each second rotation of the eccentric shaft whereas in the other operating conditions a suppression of ignition pulses does not take place. By a corresponding construction of the contact disk and by the use of several circuits such as illustrated in FIG. 3, it is impossible, in each stage of a multi-stage rotary piston internal combustion engine, to establish an ignition rhythm, during operation of the rotary piston internal combustion engine with a closed or substantially closed throttle valve, in which an ignition pulse is suppressed during each second rotation of the eccentric shaft whereas in the other operating conditions a suppression of ignition pulses does not take place. Furthermore, by varying the length of the conductive layer 29 or by providing spaced conductive layers on the contact disk 28, any other desired ignition rhythm can be established in a multi-stage rotary piston internal combustion engine.

Figure 4:
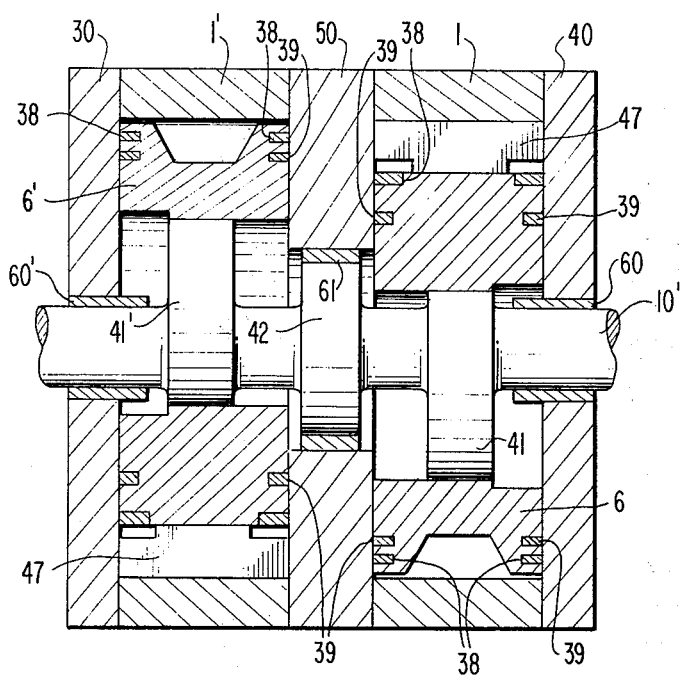
FIG. 4 is a longitudinal cross-sectional view of a multi-stage rotary piston internal combustion engine as used with the present invention.

FIG. 4 illustrates the constructional features of a multi-stage rotary piston internal combustion engine as used with the present invention. More particularly, the housing of a multi-stage rotary piston internal combustion engine essentially consists of two housing casings 1, 1', of two end parts 30, 40 and an intermediate part 50. An eccentric shaft 6' is supported in the housing, and more particularly, in the two end parts 30, 40 with the aid of suitable bearing 60, 60' and in the intermediate part 50 with the aid of a bearing 61 which is disposed on a bearing pin 42 of the eccentric shaft 10'. Two pistons 6, 6' are supported on two eccentrics 41, 41' on the eccentric shaft 10' with the aid of suitable bearings (not shown). Conventional sealing bars 47 are provided in the piston corners with appropriate sealing strips 38 and oil sealing rings 39 are provided for sealing the lateral portions of the respective pistons 6, 6'.

Figure 5:
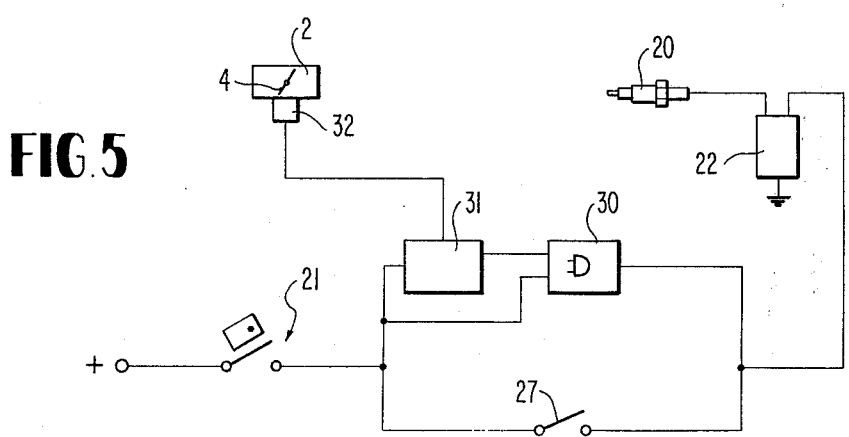
FIG. 5 is a schematic view of a further embodiment of a means for controlling the ignition pulses in accordance with the present invention.

FIG. 5 illustrates an electrical pulse suppression arrangement for suppressing ignition pulses during the operation of a rotary piston internal combustion engine with a closed or substantially closed throttle valve 4. As with the arrangement of FIG. 3, ignition pulses are fed to the spark plug 20 by way of an interrupter 21 and an ignition coil 22. A gate 30 which may be a conventional AND gate, is connected with an electronic counter of conventional construction with a sensor 32 being connected to the electronic counter 31. The sensor 32 senses the position of the throttle valve 4 and with a closed or substantially closed throttle valve 4 actuates the counter 31. A switch 27 is disposed in parallel with the electronic counter 31 and the gate 30 and is closed only when the motor vehicle in which the rotary piston internal combustion engine is installed stands still with the engine idling. As indicated with respect to the embodiment of FIG. 3, a suppression of ignition pulses is not necessary when the vehicle stands still and the engine is idling since the engine does not produce any torque and therewith also no vibrations can be transmitted to the motor vehicle. When the sensor 32 senses the throttle valve 4 as being a closed or substantially closed position, the electronic counter is actuated and emits a signal to gate 30 to suppress the ignition pulses to the spark plug thereby controlling the operating rhythm of the rotary piston internal combustion engine.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. A rotary piston internal combustion engine of trochoidal construction having at least one stage, the engine including a housing means, spark plug means disposed in said housing means for igniting a fuel-air mixture, means for supplying ignition impulses to said spark plug means, a trochoidal running surface means provided in said housing means, an eccentric shaft disposed in said housing means, a polygonal piston means for each stage rotatably supported on a corresponding eccentric of said eccentric shaft, said piston means sliding with its piston corners along said trochoidal running surface means and forming a piston flank between each two corners, a working chamber coordinated to each piston flank, said housing means including an inlet channel means and an exhaust channel means, and a throttling device disposed in said inlet channel means, said throttling device being selectively displaceable from an open to a closed position, the improvement comprising: control means for selectively suppressing an ignition pulse to said spark plug means, said control meand being operatively connected with the impulse supplying means and the throttling device and operated in dependence upon the position of the throttling device and the number of stages of the engine, said control means with the throttling device in a closed and substantially closed position, after an ignition of fuel-air mixture in a working chamber, suppresses at least once an ignition of the fuel-air mixture in the same working chamber for achieving at least one of the two characteristics consisting of high uniformity and small periodic length of the torque at the eccentric shaft.

2. A rotary piston internal combustion engine according to claim 1, wherein each piston means is of triangular shape and the trochoidal running surface means is of two-arched configuration.

3. A rotary piston internal combustion engine according to claim 1, wherein said control means includes means for suppressing each second ignition pulse in each stage.

4. A rotary piston internal combustion engine according to claim 3, with more than one stage, wherein the suppression of ignition pulses by said control means results in ignition rhythms, said ignition rhythms of each stage being mutually phase displaced.

5. A rotary piston internal combustion engine according to claim 1, with at least two stages, wherein said control means includes means for suppressing at least three ignition pulses following on another in each stage, said control means further including means for permitting at least one ignition pulse following said at least three suppressed pulses, and said suppressed pulses and ignition pulses resulting in ignition rhythms with said ignition rhythms of each stage being mutually displaced.

6. A rotary piston internal combustion engine according to claim 5, wherein said control means includes means for permitting only one ignition pulse following said at least three suppressed ignition pulses.

7. A rotary piston internal combustion engine according to claim 5, wherein said control means includes means for permitting two ignition pulses following said at least three suppressed ignition pulses.

8. A rotary piston internal combustion engine according to claim 5, wherein said control means includes means for permitting three ignition pulses following said at least three suppressed ignition pulses.

9. A rotary piston internal combustion engine according to claim 1, with at least two stages, wherein said suppression of ignition pulses by said control means results in ignition rhythms, and wherein the individual stages have different ignition rhythms.

10. A rotary piston internal combustion engine according to claim 4, with at least two stages, wherein said suppression of ignition pulses by said control means results in ignition rhythms, and wherein the individual stages have different ignition rhythms.

11. A rotary piston internal combustion engine according to claim 6, with at least two stages, wherein said suppression of ignition pulses by said control means results in ignition rhythms, and wherein the individual stages have different ignition rhythms.

12. A rotary piston internal combustion engine according to claim 1, with an uneven number of at least three stages and with eccentrics uniformly distributed over the circumference of the eccentric shaft, wherein said control means includes means for suppressing each second ignition pulse for the entire rotary piston internal combustion engine.

13. A rotary piston internal combustion engine according to claim 4, with an uneven number of at least three stages and with eccentrics uniformly distributed over the circumference of the eccentric shaft, wherein said control means includes means for suppressing each second ignition pulse for the entire rotary piston internal combustion engine.

14. A rotary piston internal combustion engine according to claim 5, with two stages wherein said control means includes means for suppressing three ignition pulses following one another in each stage, said control means further including means for permitting two ignition pulses following said three suppressed pulses, and said suppressed pulses and ignition pulses resulting in ignition rhythm with said ignition rhythms of the respective stages being mutually offset.

15. A rotary piston internal combustion engine according to claim 14, wherein the impulse supply means includes energizing circuit means for each spark plug means, and wherein means are provided for interrupting said energizing circuit means for each spark plug means, said control means being operatively connected with said interrupting means whereby suppression of the ignition pulses by said control means takes place by interrupting said energizing circuit means.

16. A rotary piston internal combustion engine according to claim 15, wherein said interruption means includes electronic means.

17. A rotary piston internal combustion engine according to claim 15, wherein said interruption means includes electromechanical means.

18. A rotary piston internal combustion engine according to claim 15, wherein said energizing circuit means includes two lines, and wherein means are provided which are operatively connected with the throttle device for interrupting one of said lines when said throttle device is in closed and substantially closed position and wherein said control means includes a contact disk means arranged in the other of said lines, said contact disk means rotating at a fraction of the rotational speed of the eccentric shaft correspondig to said ignition rhythm, said contact disk means being provided at its circumference with conductive and non-conductive means corresponding to said ignition rhythm.

19. In combination with a motor vehicle, a rotary piston internal combustion engine of trochoidal construction having at least one stage, the engine including a housing means, spark plug means disposed in said housing means for igniting a fuel-air mixture, means for supplying ignition impulses to said spark plug means, a trochoidal running surface means provided in said housing means, an eccentric shaft disposed in said housing means, a polygonal piston means for each stage rotatably supported on a corresponding eccentric of said eccentric shaft, said piston means sliding with its piston corners along said trochoidal running surface means and forming a piston flank between each two corners, a working chamber coordinated to each piston flank, said housing means including an inlet channel means and an exhaust channel means, and a throttling device disposed in said inlet channel means, said throttling device being selectively displaceable from an open to a closed position, the improvement comprising: control means for selectively suppressing an ignition pulse to said spark plug means, said control means being operatively connected with the impulse supplying means and the throttling device and operated in dependence upon the position of the throttling device and the number of stages of the engine, said control means including means for suppressing three ignition pulses following one another in the same working chamber in each stage with the throttling device in a closed and substantially closed position, said control means further including means for permitting two ignition pulses in the same working chamber following said three suppressed pulses, said suppressed pulses and ignition pulses resulting in ignition arranged with said ignition rhythms of the respective stages being mutually offset, said impulse supply means includes energizing circuit means for each spark plug means, means for interrupting said energizing circuit means for each spark plug means, said control means being operatively connected with said interrupting means whereby suppression of the ignition pulses by said control means takes place by interrupting said energizing circuit means, said energizing circuit means includes two lines, means are provided which are operatively connected with the throttle device for interrupting one of said lines when said throttle device is in a closed and substantially closed position, said control means includes a contact disk means aranged in the other of said lines, said contact disc means rotating at a fraction of the rotational speed of the eccentric shaft corresponding to said ignition rhythm, said contact disk means being provided at its circumference with conductive and non-conductive means corresponding to said ignition rhythm, and a third line connected in parallel to said two lines, and wherein means are provided for closing said third line only when the motor vehicle stands still.

20. A rotary piston internal combustion engine according to claim 1, wherein thee impulse supply means includes energizing circuit means for each spark plug means, and wherein means are provided for interrupting said energizing circuit means for each spark plug means, said control means being operatively connected with said interrupting means whereby suppression of the ignition pulses by said control means takes place by interrupting said energizing circuit means.

21. A rotary piston internal combustion engine according to claim 20, wherein said interrupting means includes means.

22. A rotary piston internal combustion engine according to claim 20, wherein said interrupting means includes electromechanical means.

23. A rotary piston internal combustion engine according to claim 20, wherein said energizing circuit means includes two lines, and wherein means are provided which are operatively connected with the throttle device for interrupting one of said lines when said throttle device is in a closed and substantially closed position and wherein said control means includes a contact disk means arranged in the other of said lines, said contact disk means rotating at a fraction of the rotational speed of the eccentric shaft corresponding to said ignition rhythm, said contact disk means being provided at its circumference with conductive and non-conductive means corresponding to said ignition rhythm.

24. In combination with a motor vehicle, a rotary piston internal combustion engine of trochoidal construction having at least one stage, the engine including a housing means, spark plug means disposed in said housing means for igniting a fuel-air mixture, means for supplying ignition impulses to said spark plug means, a trochoidal running surface means provided in said housing means, an eccentric shaft disposed in said housing means, a polygonal piston means for each stage rotatably supported on a corresponding eccentric of said eccentric shaft, said piston means sliding with its piston corners along said trochoidal running surface means and forming a piston flank between each two corners, a working chamber coordinated to each piston flank, said housing means including an inlet channel means and an exhaust channel means, and a throttling device disposed in said inlet channel means, said throttling device being selectively displaceable from an open to a closed position, the improvement comprising: control means for selectively suppressing an ignition pulse to said spark plug means, said control means being operatively connected with the impulse supplying means and the throttling device and operated in dependence upon the position of the throttling device and the number of the stages of the engine, said control means with the throttling device in a closed and substantially closed position, after an ignition of a fuel-air mixture in a working chamber, suppresses at least once an ignition of fuel-air mixture in the same working chamber for achieving at least one of the two characteristics consisting of high uniformity and small periodic length of the torque at the eccentric shaft, said impulse supply means includes energizing circuit means for each spark plug means, means are provided for interrupting said energizing circuit means for each spark plug means, said control means being operatively connected with said interrupting means whereby suppression of the ignition pulses by said control means takes place by interrupting said energizing circuit means, said energizing circuit means includes two lines, means are provided which are operatively conected with the throttle device for interrutpting one of said lines when said throttle device is in a closed and substantially closed position, said control means includes a contact disk means arranged in the other of said lines, said contact disk means rotating at a fraction of the rotational speed of the eccentric shaft corresponding to said ignition rhythm, said contact disk means being provided at its circumference with conductive and non-conductive means corresponding to said ignition rhythm, and a third line connected in paralalel to said two lines, and wherein means are provided for closing said third line only when the motor vehicle stands still.

25. A rotary piston internal combustion engine according to claim 24, wherein said control means includes means for suppressing each second ignition pulse in each stage.

26. A rotary piston internal combustion engine according to claim 24, with at least two stages, wherein said control means includes means for suppressing at least three ignition pulses following one another in each stage, said control means further including means for permitting at least one ignition pulse following said at least three suppressed pulses, and said suppressed pulses and ignition pulses resulting in an ignition rhythm with said ignition rhythms of each stage being mutually displaced.

27. A rotary piston internal combustion engine according to claim 24, with at least two stages, wherein said suppression of ignition pulses by said control means results in ignition rhythms and wherein the individual stages have different ignition rhythms.

* * * * *